United States Patent [19]

Nishiyama

[11] Patent Number: 5,606,449
[45] Date of Patent: Feb. 25, 1997

[54] OPTICAL SCANNING DEVICE

[75] Inventor: Masataka Nishiyama, Tokyo, Japan

[73] Assignee: Asahi Kogaku Kogyo Kabushiki Kaisha, Tokyo, Japan

[21] Appl. No.: 545,203

[22] Filed: Oct. 19, 1995

[30]   Foreign Application Priority Data

Oct. 21, 1994   [JP]   Japan .................................. 6-282845

[51] Int. Cl.⁶ .................................................. G02B 26/08
[52] U.S. Cl. ......................... 359/210; 359/206; 359/216; 250/234; 250/235; 347/259
[58] Field of Search ...................... 359/196, 197, 359/205, 206, 209, 210, 212–219, 811, 813, 819, 822, 900; 347/250, 258–261; 250/234–236

[56]   References Cited

U.S. PATENT DOCUMENTS 4,918,306   4/1990   Saito .
5,390,051   2/1995   Saito et al. .

Primary Examiner—James Phan
Attorney, Agent, or Firm—Greenblum & Bernstein P.L.C.

[57]   ABSTRACT

An optical scanning device includes a laser source, an optical deflector which deflects scanning beams emitted from the laser source in a main scanning direction toward an object to be scanned, and a reflecting mirror which reflects the scanning beams. A beam detector which receives the scanning beams reflected by the reflecting mirror and a correcting lens which is provided between the reflecting mirror and the beam detector and which has a power at least in the main scanning direction are also provided. An adjusting lens holder is provided for adjusting the position of the correcting lens in the main scanning direction upon assembly so that an incident timing of the scanning beams onto the beam detector can be adjusted.

19 Claims, 6 Drawing Sheets

OPTICAL SCANNING DEVICE

BACKGROUND OF THE INVENTION

1. Field of the Invention

The present invention relates to an optical scanning device which can be used, for example, in a laser printer or similar device.

2. Description of Related Art

In a laser printer in which a photosensitive medium, such as a photosensitive drum, is scanned with scanning beams which are moved in a main scanning direction and which are converged onto the photosensitive medium to write data to be printed thereon, the timing of the data writing, at which the recording of data to be printed onto the photosensitive medium begins, is determined in accordance with the time at which the beams are detected at a predetermined position on the upstream side of scanning beams in the main scanning direction. To this end, a beam detector is provided, in the laser printer mentioned above, to detect the scanning beams at the commencement of the scanning.

The beam detector is preferably located at the position where the scanning beams are converged. However, if the beam detector is disposed at the beam convergent point on the upstream side of the scanner, the optical scanning device becomes large, and the optical detector interferes with the photosensitive medium. To prevent this, one or a plurality of reflecting mirrors and lenses are provided to reflect the scanning beams toward the beam detector, which is located at a position in which no interference with the photosensitive medium occurs, on the upstream sides of the scanning beams in the main scanning direction.

FIG. 7 shows a known optical scanning device, including a collimator 3 which collimates the laser beams emitted from a laser diode LD (not shown), a converging lens 4, a polygonal mirror 5, an fθ lens 6, a BD mirror (horizontal synchronization mirror) 8, a lens holder 10 having a converging lens 9, and a beam detector 11, in a housing 2 of an optical scanning device 30.

In the optical scanning device 30, the beam "A" emitted from the laser diode through the collimator 3 is deflected by the polygonal mirror 5 in the main scanning direction M, so that the scanning beam A1 thus deflected can be converged onto the photosensitive drum (not shown) by the fθ lens 6. The timing of the writing at which the data to be printed is written onto the photosensitive drum is determined in accordance with the time at which the beam A2, reflected by the BD mirror 8 and converged by the converging lens 9 at the commencement of the scanning, is detected by a light receiving element 12 of the beam detector 11.

In the known scanning apparatus 30 mentioned above, since the scanning beam A2, at the commencement of scanning, is made incident upon the beam detector 11 through the BD mirror 8 and the converging lens 9, the BD mirror 8 must be mounted to the housing 2 with an extremely high precision.

Namely, if the BD mirror 8 is mounted to the housing 2 at a position slightly deviated from a predetermined position, the scanning beam A2, reflected by the BD mirror 8, is considerably deviated from a predetermined light path, the result being that the detection timing of the scanning beams A2 detected by the light receiving element 12 is deviated from a correct timing, thus leading to an incorrect timing of the writing of the printing data onto the photosensitive drum (not shown).

To prevent this, an adjusting mechanism (not shown) is provided on the BD mirror 8 of the optical scanner 30 to adjust the mounting position thereof to the housing 2. The BD mirror 8 is mounted to the housing 2 while adjusting the mounting position thereof by the adjusting mechanism so as to be able to correct the path of the scanning beam, within a predetermined tolerance, towards the light receiving element 12 of the beam detector 11. However, this adjusting operation, provided on the BD mirror 8, is troublesome. Moreover, the adjusting mechanism increases the manufacturing cost.

SUMMARY OF THE INVENTION

It is an object of the present invention to provide an optical scanning device in which a positional deviation of light incident upon a beam detector, particularly in the main scanning direction can be easily corrected by a simple mechanism.

To achieve the object, according to the present invention, there is provided an optical scanning device comprising a laser source, an optical deflector which deflects scanning beams emitted from the laser source in a main scanning direction toward an object to be scanned, a reflecting mirror which reflects the scanning beams, a beam detector which receives the scanning beams reflected by the reflecting mirror, a correcting lens which is provided between the reflecting mirror and the beam detector and which has a power at least in the main scanning direction, and an adjusting means for adjusting the position of the correcting lens in the main scanning direction upon assembly, so that an incident timing of the scanning beams to the beam detector is adjusted.

Preferably, the adjusting means comprises a lens holding frame which holds the correcting lens to be slidable in the main scanning direction.

The correcting lens can selectively occupy a reference position and an adjusted position in which the posture thereof in the sub-scanning direction is inverted, and wherein the lens holding frame holds the correcting lens so as not to move in the main scanning direction and a sub-scanning direction which is normal to the main scanning direction when the correcting lens is in the reference position and so as to slide in the main scanning direction when the correcting lens is in the adjusted position, respectively.

The reflecting mirror has no position adjusting means.

According to another aspect of the present invention, there is provided an adjusting method for an optical scanning device, the optical scanning device comprising a laser source; an optical deflector which deflects scanning beams emitted from the laser source in a main scanning direction toward an object to be scanned; a reflecting mirror which reflects the scanning beams; a beam detector which receives the scanning beams reflected by the reflecting mirror to detect the position of the scanning beams in the main scanning direction; and a correcting lens which is provided between the reflecting mirror and the beam detector and which has a power at least in the main scanning direction. The method includes the steps of positioning (securing) the elements other than the correction lens at a predetermined design position; and adjusting the position of the correcting lens in the main scanning direction to adjust the incident timing of the scanning beams upon the beam detector in the main scanning direction upon assembly, without adjusting the position of the reflecting mirror.

According to still another aspect of the present invention, there is provided an optical scanning device which comprises a light source which emits beams of light, an optical deflector which deflects the beams of light emitted from the light source to scan in a main scanning direction, a beam detector which detects the scanning beams deflected by the optical deflector, a reflecting mirror which reflects the scanning beams deflected by the optical deflector toward the beam detector, and a correcting lens mounting frame to which a correcting lens provided between the reflecting mirror and the beam detector and having a power at least in a main scanning direction of the scanning beams is mounted. The correcting lens is movable in the main scanning direction of the scanning beams upon assembly to adjust the incident timing of the scanning beam upon the beam detector.

The reflecting mirror is preferably located on the upstream sides of the scanning beams in the main scanning direction, and the beam detector is preferably located on the downstream side in the direction of the movement of the scanning beams.

In an embodiment, the correcting lens is comprised of a correcting lens portion, lens mounting portions provided on opposite sides of the correcting lens portion in the scanning direction of the scanning beams, and projections which are provided at one end of each lens mounting portion in a direction perpendicular to the scanning direction and which project from the correcting lens portion. A lens holding frame is provided with a pair of bulged portions which define an opening in which the correcting lens can be received, guide grooved formed in the bulged portions and extending in the direction perpendicular to the main scanning direction, so that the lens mounting portions can be inserted in the guide grooves to move in the main scanning direction, and recesses that are formed at the ends of the guide grooves extending in the direction perpendicular to the main scanning direction, so that the projections can be fitted and secured in the corresponding recesses.

The present disclosure relates to subject matter contained in the Japanese Patent Application No. 6-282845 (filed on Oct. 21, 1994) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
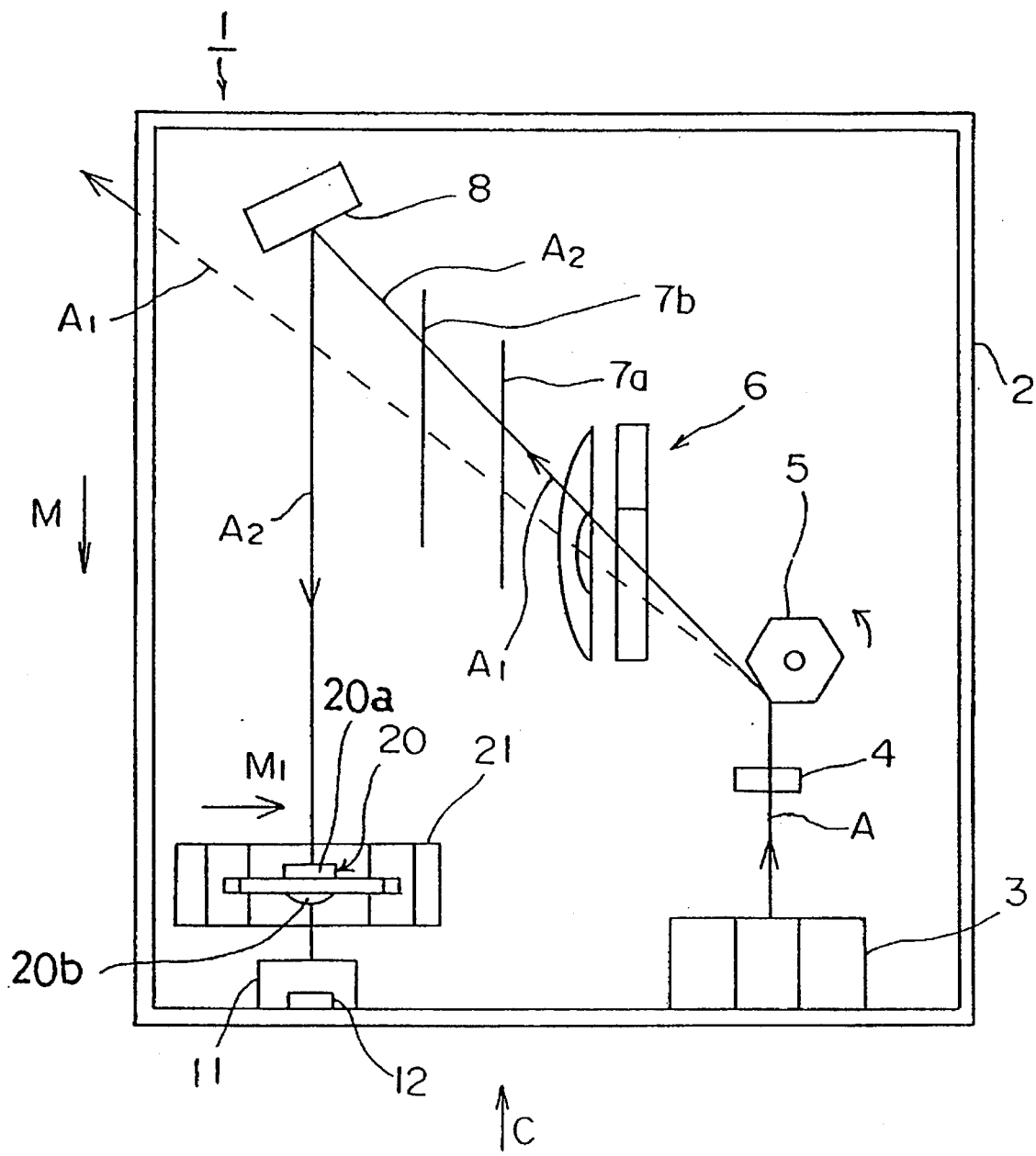
FIG. 1 is a schematic view of an optical scanning device according to an embodiment of the present invention.

As shown in FIG. 1, a housing 2 of an optical scanning device i is provided therein with a collimator 3 which collimates the laser beams emitted from, for example, a laser diode LD (not shown), a polygonal mirror (deflector) 5, a cylindrical lens 4 having a power in the sub-scanning direction and forming a line image in the vicinity of a reflection surface of the polygonal mirror 5, an fθ lens 6, reflecting mirrors 7a and 7b, a BD mirror 8, a lens holding frame 21 to which a correcting lens (light gathering lens) mold 20 is mounted, and a beam detector 11.

Figure 7:
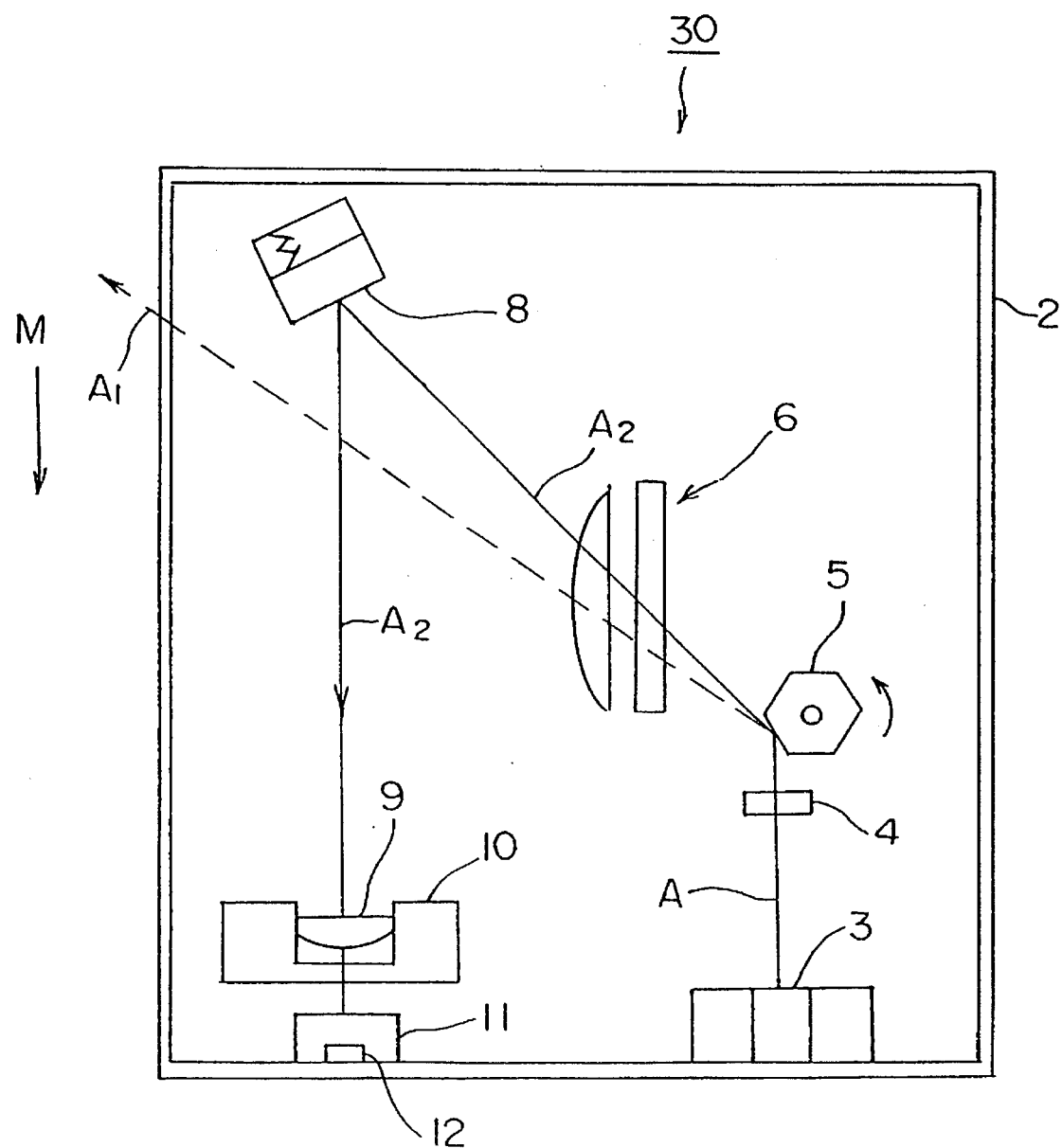

The basic operation of the optical scanning device 1 is substantially the same as the conventional optical scanning device shown in FIG. 7. Namely, the beams of light "A" including data to be printed, emitted from the laser diode and collimated by the collimator 3 are converged by the cylindrical lens 4 in the vicinity of a reflecting surface of the polygonal mirror 5, the beams A1 deflected by the polygonal mirror 5 are converged onto a photosensitive drum (not shown) by the fθ lens 6 to form a latent image of an object. The timing of the writing of the data to be printed onto the photosensitive drum by the scanning beams A1 is determined in accordance with the timing which the scanning beams A2, reflected by the reflecting mirrors 7a and 7b and the BD mirror 8 at the commencement of the scanning, are detected by a light receiving element 12 of the beam detector 11.

Figure 2:
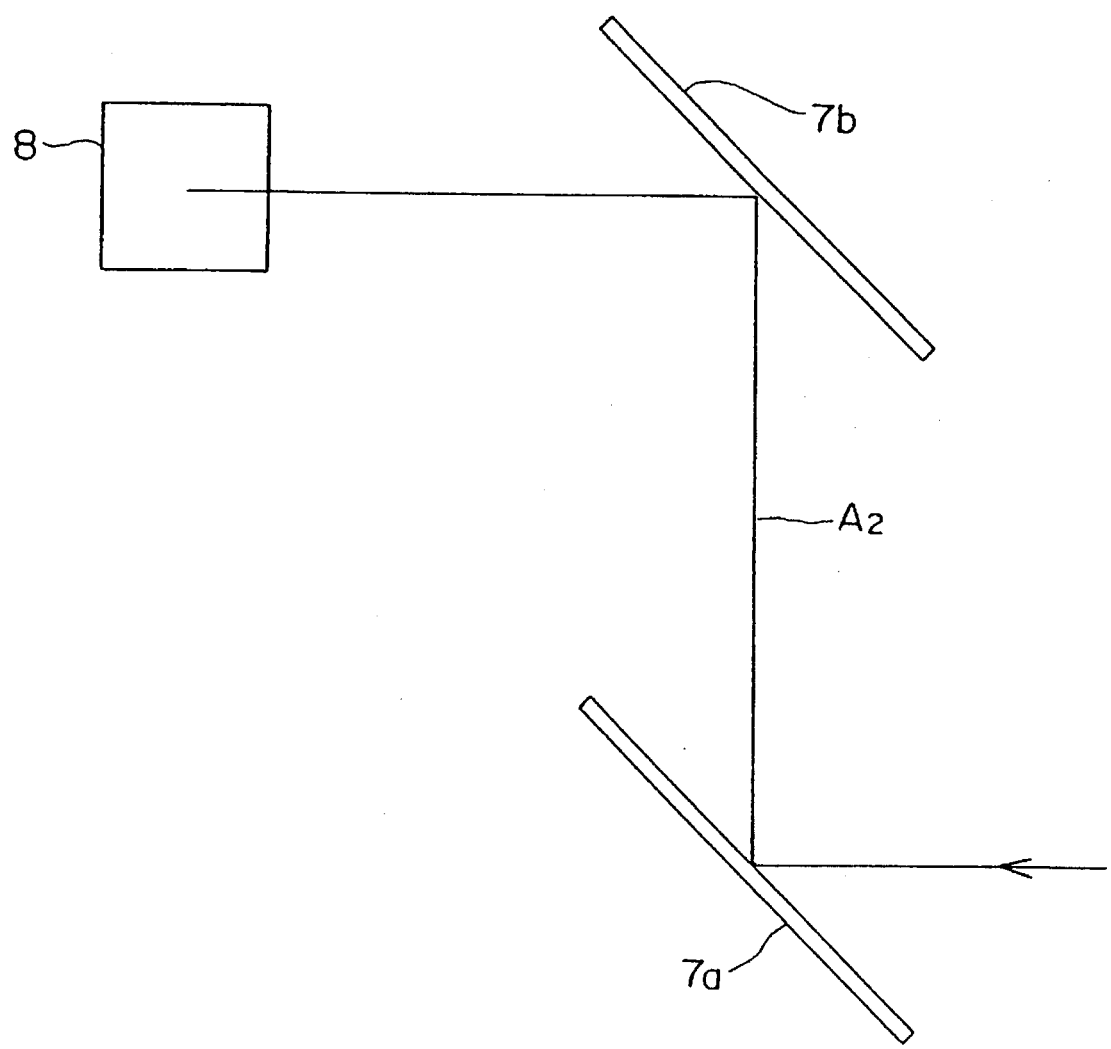
FIG. 2 is a conceptual view of a reflecting mirror and a BD mirror.

The basic concept of the present invention resides in an adjusting mechanism for adjusting the incident timing of the scanning beams A2 on the light receiving element 12, which will be discussed below. In FIG. 2, which is a view from the direction indicated by the arrow "C" in FIG. 1, the reflecting mirror 7a reflects the scanning beams A2 in the upward direction at right angles (90°) towards the reflecting mirror 7b, which then reflects the scanning beams A2 in the direction of the BD mirror 8. The beams A2 scan in the direction of M1 shown in FIG. 1 and FIG. 3 by the rotation of the polygonal mirror 5. The scanning beams A2 reflected by the BD mirror 8 are received by the light receiving element 12 of the beam detector 11. It should be appreciated that no mechanism for adjusting the mounting position is provided on the reflecting mirrors 7a and 7b, nor the BD mirror 8.

Note that for the purpose of clarity the light A2 is reflected by the reflecting mirrors 7a and 7b in FIG. 1, although in actual fact the scanning beams A2 are actually reflected through 90 degrees by the reflecting mirrors 7a and 7b toward the BD mirror 8, as shown in FIG. 2.

The reflecting mirrors 7a and 7b and the BD mirror 8 are disposed on the upstream side of the scanning beams A1 in the main scanning direction to be made incident upon the photosensitive drum, and the beam detector 11 is disposed on the downstream side, respectively.

Figure 3:
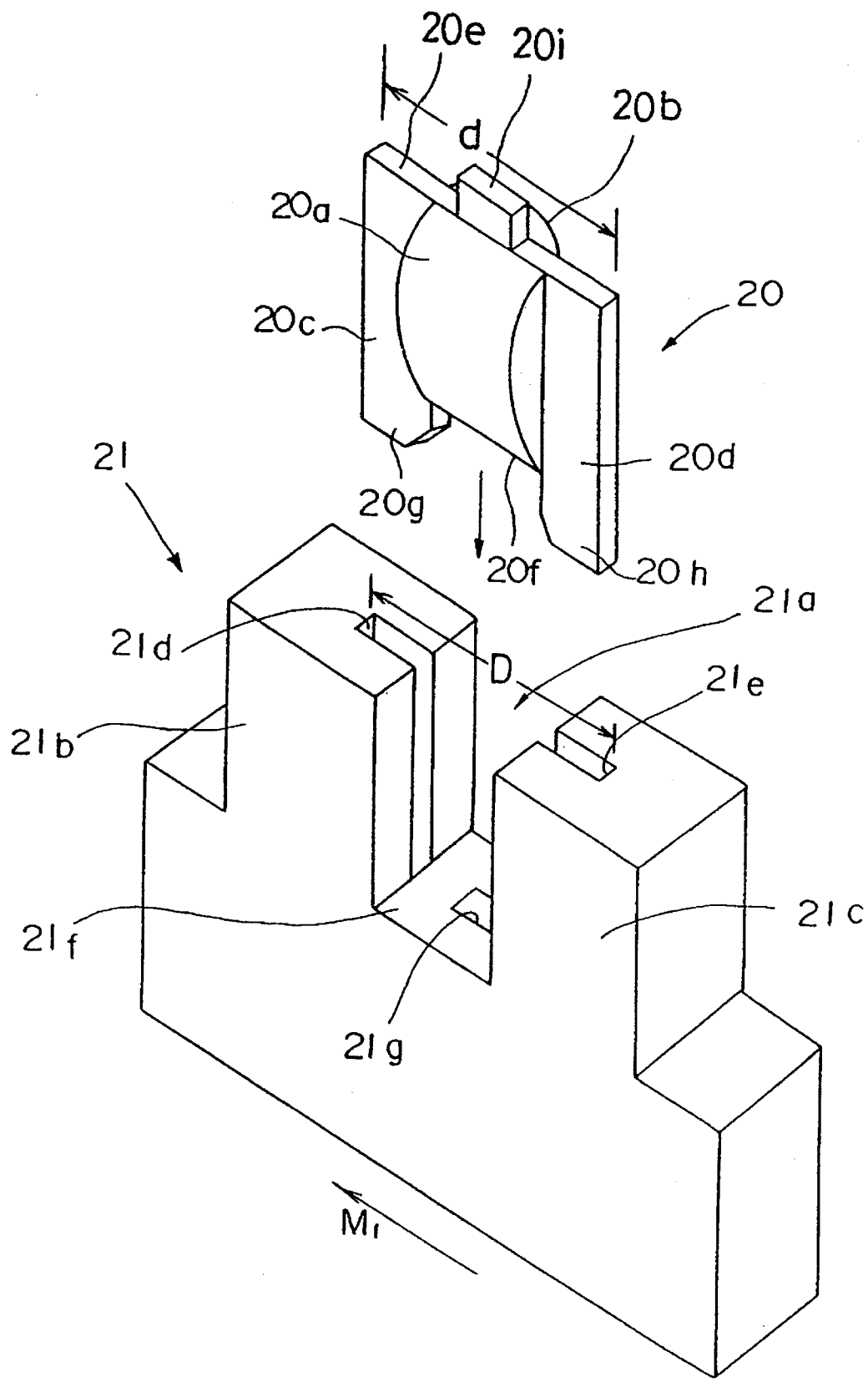
FIG. 3 is a perspective view of a mounting mechanism of a correcting lens mounted to a lens holding frame.

Referring again to FIG. 1 and to FIG. 3, the correcting lens mold 20 and the lens holding frame 21 are located in front of the beam detector 11. The correcting lens mold 20 is made of a synthetic resin mold and is integrally provided, on the incident and emission sides thereof, with converging lens portions 20a and 20b to converge the scanning beams A2 onto the light receiving element 12, and, on the opposite sides of the converging lens portions, with lens mounting portions 20c and 20d, respectively. The converging lens portions 20a and 20b are made of cylindrical lenses having powers (curvatures) in the sub-scanning direction perpendicular to the main scanning direction M1 and the main scanning direction, respectively.

In other words, the lens portion 20a is adapted to converge the scanning beams in a predetermined detecting area in the sub-scanning direction. The lens portion 20b is adapted to converge the scanning beams in the main scanning direction. In addition, it should be noted that the beams A2 reflected by the BD mirror 8 is converged before the correcting lens, so that the beams A2 are incident on the correcting lens as diffusion beams.

The upper surfaces of the lens mounting portions 20c and 20d and the upper surfaces of the converging lens portions 20a end 20b define a flat surface portion 20e which lies in a plane parallel with the main scanning direction and perpendicular to the sub-scanning direction. The lower surfaces of the converging lens portions 20a and 20b define a flat surface portion 20f which lies in a plane parallel with the main scanning direction and normal to the sub-scanning direction. The lens mounting portions 20c and 20d are provided on the lower ends thereof with projections 20g and 20h which project from the flat surface portion 20f in the sub-scanning direction, respectively. Note that "20i" designates the projection (corresponding to a gate) which is formed on the correcting lens mold 20 upon molding and which projects in the sub-scanning direction from the flat surface portion 20e.

The lens holding frame 21 is provided with a pair of supporting posts (projections) 21b and 21c which define therebetween an opening (window) 21a in which the converging lens portions 20a and 20b of the correcting lens mold 20 can be fitted. The supporting posts 21b and 21c are provided on the opposed surfaces thereof with guide grooves 21d and 21e which extend in the sub-scanning direction, so that the lens mounting portions 20c and 20d of the correcting lens mold 20 can be inserted in the guide grooves 21d and 21e. The lens holding frame 21 is provided with recesses 21h and 21i (FIGS. 4 and 5) connected to the corresponding guide grooves 21d and 21e.

The lens holding frame 21 is provided with a flat surface portion 21f which defines the bottom surface of the opening 21a between the supporting posts 21b and 21c and which lies in a plane parallel with the main scanning direction and perpendicular to the sub-scanning direction. The flat surface portion 21f is provided on the center portion thereof with a recess 21g. The flat surface portion 21f and the recess 21g correspond to the flat surface portion 20e and the projection 20i of the correcting lens mold 20, respectively.

Figure 4:
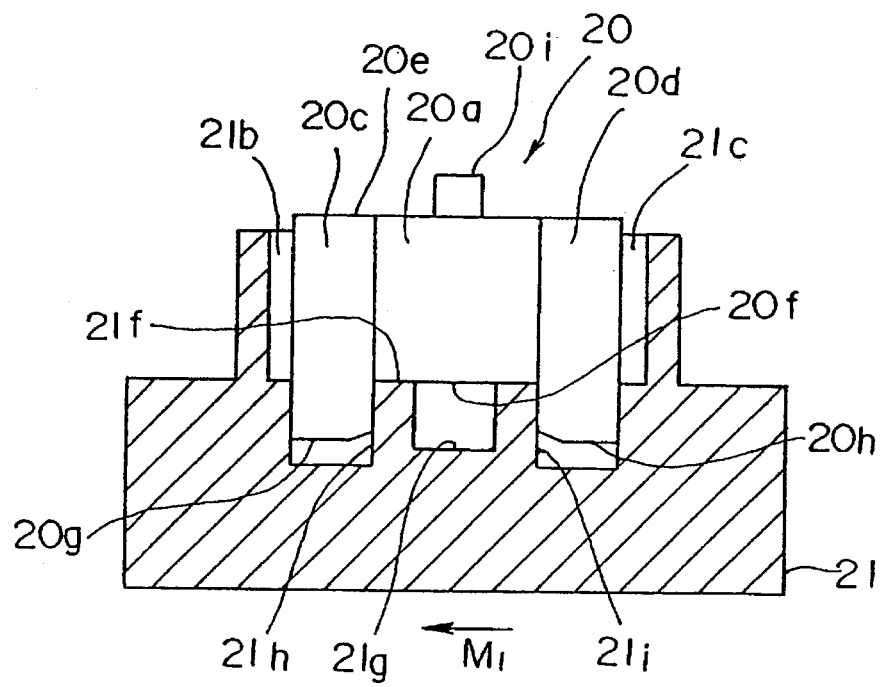
FIG. 4 is a sectional view of a correcting lens mounted to a lens holding frame at a predetermined position.

When the correcting lens mold 20 is in the position shown in FIGS. 3 and 4, the lens mounting portions 20c and 20d are snugly fitted in the recesses 21h and 21i of the lens holder 21 to restrict the position of the correcting lens mold 20 in the main scanning direction. The position of the correcting lens mold 20 in one of the sub-scanning directions is restricted when the flat surface portion 21f comes into contact with the flat surface portion 20f. When the correcting lens mold 20 is in a position shown in FIG. 5 in which the direction (posture) of the correcting lens mold 20 is inverted, the position of the correcting lens mold 20 in one of the sub-scanning directions is restricted by a surface contact of the flat surface portion 20e thereof with the flat surface portion 21f. The distance D between the guide grooves 21d and 21e at the bottom thereof is larger than the distance "d" of the outer ends of the lens mounting portions 20c and 20d, so that when the flat surface portion 20e abuts against the flat surface portion 21f of the lens holding frame 21, the correcting lens mold 20 is movable in the main scanning direction by the difference between the distances D and "d" (D–d). In this state, the projection 20i is fitted in the recess 21g.

The lens holding frame 21 is precisely attached to a mounting portion (not shown) of the housing 2, so that the scanning beams A2 transmitted through the converging lenses 20a and 20b are made incident upon the light receiving element 12 at a predetermined timing.

The adjusting operation of the present invention will be discussed below.

The lens mounting portions 20c and 20d with the projections 20g and 20h oriented downward are inserted in the corresponding guide grooves 21d and 21e, so that the projections 20g and 20h are fitted in the corresponding recesses 21h and 21i. Consequently, the flat surface portion 20f is disposed on the flat surface portion 21f. Thus, the converging lens portions 20a and 20b are arranged in the opening 21a.

Consequently, the position of the converging lens portions 20a and 20b of the correcting lens mold 20 in the main scanning direction and the sub-scanning direction is restricted. Provided that there is no manufacturing error or assembly error. Namely, the scanning beams can be correctly made incident upon the beam detector 12 at the predetermined timing. Thus, if it is detected that the scanning beams A2 being incident upon the light receiver 12 at the predetermined timing, the guide grooves 21d and 21e are filled with an adhesive to immovably connect the correcting lens mold 20 to the lens holding frame 21.

Figure 5:
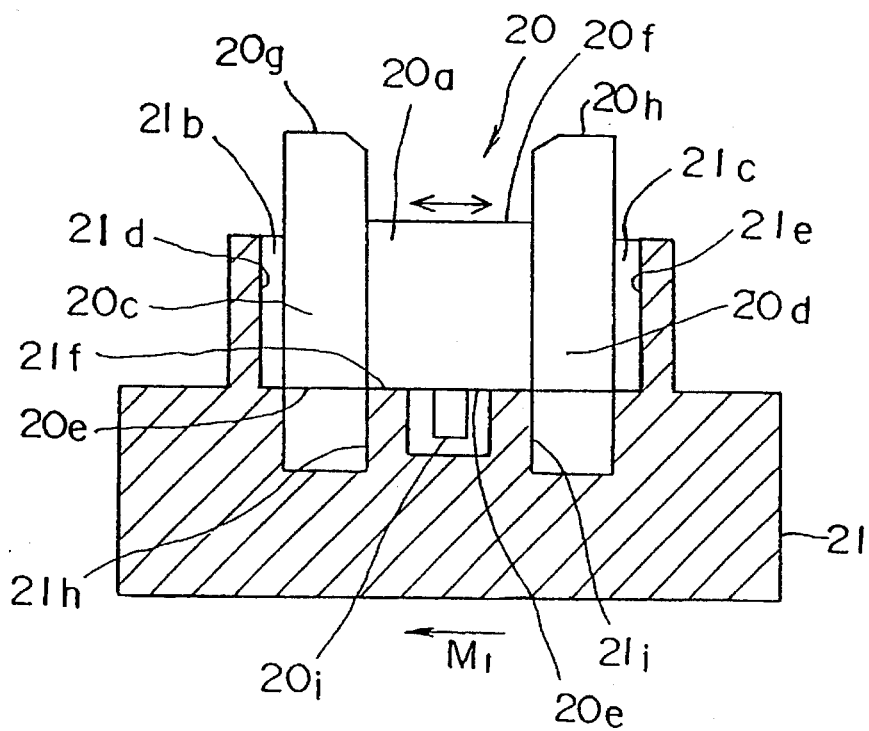
FIG. 5 is a sectional view of a correcting lens whose optical axis is adjustable within a lens holding frame.

If the incident timing of the scanning beams A2 upon the light receiver 12 is deviated from a predetermined timing in the main scanning direction, the correcting lens mold 20 is detached from the lens holding frame 21, and thereafter, the correcting lens mold 20 is inverted, as shown in FIG. 5. Consequently, the lens mounting portions 20c and 20d are inserted in the corresponding guide grooves 21d and 21e, so that the converging lens portions 20a and 20b are located in the opening 21a.

Consequently, the flat surface portion 20e of the correcting lens mold 20 abuts against the flat surface portion 21f of the lens holding frame 21, and hence, the lens holding frame 21 is movable only in the main scanning direction M1 of the scanning beams A2.

Thus, the correcting lens mold 20 is moved in the main scanning direction M1 of the scanning beams A2 to adjust the incident timing of the scanning beams A2 emitted from the correcting lens mold 20 to eliminate the deviation. Upon completion of the adjustment, the guide grooves 21d and 21e are filled with an adhesive to adhere the correcting lens mold 20.

The adjusting operation in the present invention can be carried out more precisely and easily than the conventional adjusting operation in which the reflecting mirrors are moved, owing to the short distance between the correcting lens mold 20 and the light receiver 12. Thus, the efficiency of the adjustment can be remarkably enhanced in the present invention.

Figure 6:
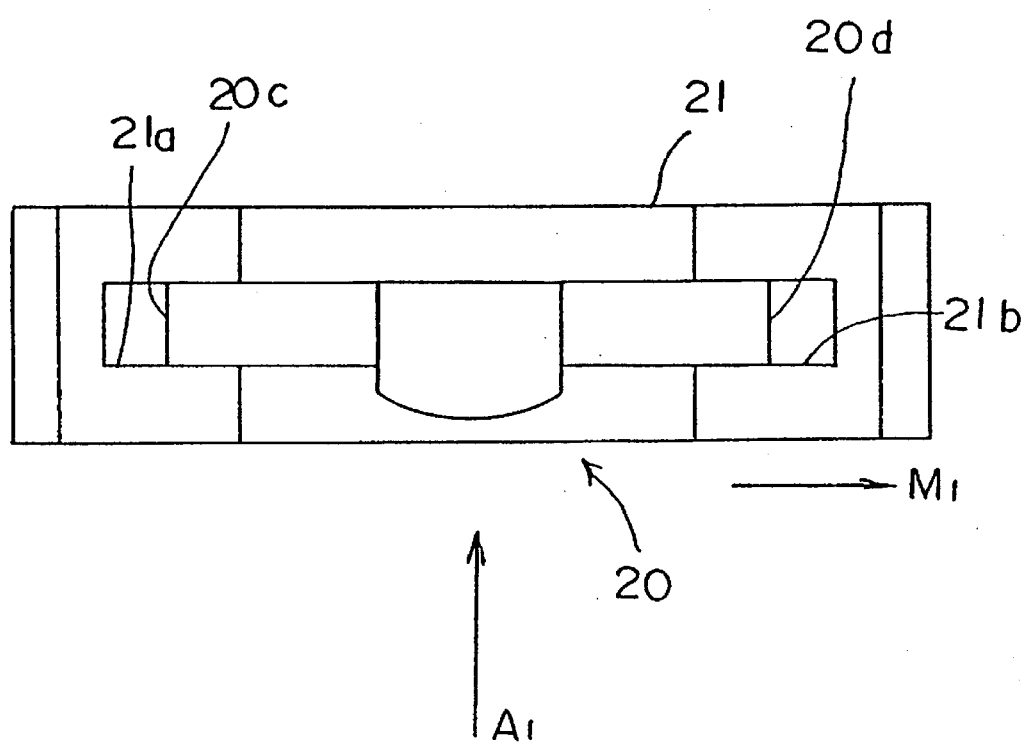
FIG. 6 is a schematic plan view of a correcting lens mounted to a lens holding frame according to another embodiment of the present invention; and, FIG. 7 is a schematic view of a known optical scanning device.

Although the correcting lens mold 20 has a power in both the main scanning direction M1 and the sub-scanning direction, in the illustrated embodiment, it is possible to use a correcting lens mold having a power only in the main scanning direction as shown in FIG. 6.

Although the lens holding frame 21 is made of a separate piece from the housing 2 in the illustrated embodiment, it is possible to make the lens holding frame 21 integral with the housing 2.

As can be seen from the above discussion, according to the present invention, in an optical scanner comprising a light source which emits beams of light, an optical deflector which deflects the beams of light emitted from the light source to scan, a beam detector which detects the scanning beams deflected by the optical deflector, a reflecting mirror which reflects the scanning beams deflected by the optical deflector toward the beam detector, and a correcting lens mounting frame to which a correcting lens provided between the reflecting mirror and the beam detector and having a curvature at least in a main scanning direction of the scanning beams is mounted, the correcting lens is mounted to the lens mounting frame so as to move in the main scanning direction of the scanning beams to adjust the timing of the scanning beams to be correctly made incident upon the beam detector.

With this arrangement, the adjustment of the timing of scanning beams to be made incident upon the beam detector can be easily effected only by the movement of the correcting lens mold in the main scanning direction of the scanning beams. The adjustment of the timing is attained by the change of the optical path of the scanning beams emitted from the correcting lens due to the movement of the correcting lens. Consequently, it is not necessary to provide an adjusting mechanism on the reflecting mirror, as in the prior art. Thus, the assembling operation can be effected more simply and less expensively than the prior art.

What is claimed is:

1. An optical scanning device comprising:
   a laser source;
   an optical deflector which deflects scanning beams emitted from the laser source in a main scanning direction toward an object to be scanned;
   a reflecting mirror which reflects the scanning beams;
   a beam detector which receives the scanning beams reflected by the reflecting mirror;
   a correcting lens which is provided between the reflecting mirror and the beam detector and which has a power at least in the main scanning direction; and,
   adjusting means for adjusting the position of the correcting lens in the main scanning direction, so that an incident timing of the scanning beams to the beam detector is adjusted.

2. The optical scanning device according to claim 1, the adjusting means comprising a lens holding frame which holds the correcting lens to be slidable in the main scanning direction.

3. The optical scanning device according to claim 1, the adjusting means comprising a lens holding frame which holds the correcting lens, wherein the correcting lens can selectively occupy a reference position and an adjustable position in which the posture thereof in the sub-scanning direction is inverted with respect to the reference position, and wherein the lens holding frame holds the correcting lens so as not to move in the main scanning direction and a sub-scanning direction which is normal to the main scanning direction when the correcting lens is in the reference position, and so as to slide in the main scanning direction when the correcting lens is in the adjustable position, respectively.

4. The optical scanning device according to claim 3, wherein the reference position is predetermined.

5. The optical scanning device according to claim 1, wherein the reflecting mirror has no position adjusting means.

6. The optical scanning device according to claim 1, wherein said scanning device further comprises a scanning lens group for attaining a constant scanning speed, said scanning lens group being provided between said optical deflector and said reflecting mirror.

7. The optical scanning device according to claim 6, wherein said scanning lens group is a fθ lens.

8. The optical scanning device according to claim 1, wherein said correcting lens has a cylindrical surface having a power in the main scanning direction.

9. The optical scanning device according to claim 1, wherein said correcting lens has a cylindrical surface having a power in the sub-scanning direction.

10. An adjusting method for an optical scanning device, said optical scanning device comprising a laser source; an optical deflector which deflects scanning beams emitted from the laser source in a main scanning direction toward an object to be scanned; a reflecting mirror which reflects the scanning beams; a beam detector which receives the scanning beams reflected by the reflecting mirror; and a correcting lens which is provided between the reflecting mirror and the beam detector and which has a power at least in the main scanning direction;

said method comprising the steps of:
   positioning said laser source, said optical deflector, said reflecting mirror and said beam detector at a predetermined position; and
   adjusting the position of said correcting lens in the main scanning direction, so that an incident timing of the scanning beams to the beam detector is adjusted.

11. An optical scanning device comprising:
   a light source which emits beams of light;
   an optical deflector which deflects the beams of light emitted from the light source to scan in a main scanning direction;
   a beam detector which detects the scanning beams deflected by the optical deflector;
   a reflecting mirror which reflects the scanning beams deflected by the optical deflector toward the beam detector; and,
   a correcting lens mounting frame to which a correcting lens provided between the reflecting mirror and the beam detector and having a power at least in the main scanning direction is mounted, said correcting lens being movable in the main scanning direction of the scanning beams to adjust an incident timing of the scanning beams to be correctly incident on the beam detector.

12. The optical scanning device according to claim 11, wherein the reflecting mirror is located on the upstream side of the scanning beams in the main scanning direction.

13. The optical scanning device according to claim 12, wherein the beam detector is located on the downstream side of the scanning beam in the main scanning direction.

14. The optical scanning device according to claim 11, wherein the correcting lens comprises a molded correcting lens having a converging lens portion, lens mounting portions provided on opposite sides of the converging lens portion in the main scanning direction of the scanning beams, and projections which are provided at one end of each lens mounting portion and which project from the correcting lens portion in a direction perpendicular to the main scanning direction,
   said correcting lens mounting frame being provided with a pair of bulged portions which define an opening in which the correcting lens can be received, guide grooves formed in the bulged portions and extending in the direction perpendicular to the main scanning direction, so that the lens mounting portions can be inserted in the guide grooves and recesses that are formed at the ends of the guide grooves extending in a direction perpendicular to the main scanning direction, so that the projections can be fitted and secured in the corresponding recesses.

15. The optical scanning device according to claim 14, wherein the molded correcting lens can selectively occupy a reference position and an adjusted position in which the posture thereof in the sub-scanning direction is inverted with respect to the reference position, and wherein the correcting lens mounting frame holds the molded correcting lens so as not to move in the main scanning direction and the sub-scanning direction when the correcting lens is mounted in the reference position and so as to slide in the main scanning direction when the correcting lens is in the adjusted position, respectively.

16. The optical scanning device according to claim 11, wherein said scanning device further comprises a scanning lens group for attaining a constant scanning speed, said scanning lens group being provided between said optical deflector and said reflecting mirror.

17. The optical scanning device according to claim 16, wherein said scanning lens group is a fθ lens.

18. The optical scanning device according to claim 11, wherein said correcting lens has cylindrical surface having a power in the main scanning direction.

19. The optical scanning device according to claim 11, wherein said correcting lens has a cylindrical surface having a power in the sub-scanning direction.

* * * * *